(12) United States Patent
Kondo

(10) Patent No.: US 6,561,465 B2
(45) Date of Patent: May 13, 2003

(54) CLAMP STRUCTURE FOR HOLDING CLIP ONTO FLAT CABLE

(75) Inventor: Masayuki Kondo, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/883,943

(22) Filed: Jun. 20, 2001

(65) Prior Publication Data

US 2001/0054671 A1 Dec. 27, 2001

(30) Foreign Application Priority Data

Jun. 21, 2000 (JP) .................................. 2000-186908

(51) Int. Cl.⁷ ........................ F16L 3/08; H01B 7/00
(52) U.S. Cl. ............... 248/74.3; 248/74.1; 24/16 PB; 174/135
(58) Field of Search ................. 248/74.3, 68.1, 248/49, 62, 65, 67.5, 69, 71, 74.1, 74.4, 503, 499; 24/16 R, 17 A, 17 AP, 16 RB; 174/135, 72 A, 440 CC; 439/400, 412

(56) References Cited

U.S. PATENT DOCUMENTS

| | | | | |
|---|---|---|---|---|
| 2,342,958 A | * | 2/1944 | Morehouse | 248/68.1 |
| 3,816,818 A | * | 6/1974 | Meier | 439/412 |
| 3,896,259 A | * | 7/1975 | Fry | 174/72 A |
| 4,118,096 A | * | 10/1978 | Takahashi | 439/400 |
| 4,221,352 A | * | 9/1980 | Caveney | 248/74.3 |
| 4,457,482 A | * | 7/1984 | Kitagawa | 248/74.3 |
| 4,635,886 A | * | 1/1987 | Santucci et al. | 248/73 |
| 4,669,688 A | * | 6/1987 | Itoh et al. | 248/74.2 |
| 4,918,261 A | * | 4/1990 | Takahashi et al. | 174/135 |
| 5,860,832 A | * | 1/1999 | Wayt et al. | 439/465 |
| 2001/0010349 A1 | | 8/2001 | Sakakura | |

FOREIGN PATENT DOCUMENTS

| | | |
|---|---|---|
| JP | 49-21179 | 2/1974 |
| JP | 63-240307 | 10/1988 |
| JP | 63-187382 | 11/1988 |
| JP | 7-274357 | 10/1995 |
| JP | 07-274357 | 10/1995 |

* cited by examiner

*Primary Examiner*—Anita King
(74) *Attorney, Agent, or Firm*—Oblon, Spivak, McClelland, Maier & Neustadt, P.C.

(57) ABSTRACT

A clamp for holding a flat cable comprises a base, a cover, a projection extending from the base toward the cover, and a pair of cantilevers positioned at points symmetrical with respect to the center of the cover and extending toward the base. The base consists of a bottom and two sidewalls extending from the bottom and facing each other, and the flat cable is received in this bottom. The flat cable has a slit, and the projection is inserted into the slit when the base receives the flat cable. The cantilevers hold down the top surface of the flat cable when the cover is closed. The clamp also has a clip extending from the bottom of the base in a direction opposite to that of the projection. The clip allows the flat cable to be attached to, for example, an automobile body in a simple manner.

9 Claims, 5 Drawing Sheets

CLAMP STRUCTURE FOR HOLDING CLIP ONTO FLAT CABLE

BACKGROUND OF THE INVENTION

1. Field of the Invention

The present invention relates to a clamp structure for attaching a clip onto a flat cable in a reliable manner.

2. Description of the Related Art

Flat cables are used in an automobile to connect electric devices of the automobile to each other. The flat cable is generally furnished with clips. Each clip is attached to the flat cable using a clamp, thereby allowing the flat cable to be fixed in a prescribed position in the automobile body. In general, multiple clips are arranged along a flat cable in the longitudinal direction at a specific pitch. An example of these clips is disclosed in Japanese Patent Application Laid-Open No. 7-274357. This clip has a clamp structure comprising a bottom flange and a projection extending upward from the bottom flange. The projection is inserted between the adjacent wires that comprise the flat cable until the top portion projects from the top face of the flat cable. The projection is then heated and shaped into a top flange, whereby the top and bottom flanges hold the flat cable between them. However, if the flat cable consists of multiple layers of wires, the fused top flange can hold only the top layer of the flat cable, and the flat cable in contact with the bottom flange may shift.

To overcome this problem, a clamp structure 1 illustrated in FIGS. 1A and 1B has been proposed. The clamp 1 consists of a base 3 and a cover 5 pivoting about a hinge 25, and is capable of holding a flat cable 7 consisting of multiple layers of wires firmly.

The base 3 has a flat-cable receiving section 9 having a side-wall that receives a side edge of the flat cable 7. The cover 5 has a flexible pusher 23 in its inner face. The pusher 23 extends along the width of the flat cable 7, and hangs down from the inner face of the cover 5, and has a convex middle. When the cover 5 is closed, the pusher 23 comes into contact with the top face of the flat cable 7, and presses the top face of the multi-layered flat cable 7, while the pusher is deformed or flattened. Consequently, the flat cable 7 is held firmly between the pusher 23 and the base 3.

To prevent the clamp 1 from shifting greatly in a longitudinal direction along the flat cable 7, stoppers 29 are formed along the side edges of the flat cable 7 at predetermined positions, as illustrated in FIG. 2. This arrangement can maintain the clamp 1 in the designed position, while allowing for slight adjustment of the position of the clamp 1.

However, the pusher 23 of the conventional clamp 1 must have a large elasticity and flexibility to hold the flat cable 7 between the pusher 23 and the base 3. To this end, if the number of layers or the thickness of the flat cable 7 increases, the amount of deformation of the pusher 23 increases, requiring a large force to close the cover 5. This makes it difficult to attach the clamp 1 to the flat cable 7.

On the other hand, if the number of layers or the thickness of the flat cables 7 decreases, the deformation of the pusher 23 is slight, and the clamping force generated by the pusher 23 and the base 9 is weakened. This situation may cause the clamp 1 to shift along the flat cable 7.

In addition, many types of clamps 1 have to be prepared in accordance with different types or thicknesses of flat cables 7, and the conventional flat cable 7 itself needs to have stoppers or fringes 29 attached to it. For these reasons, the manufacturing cost of the clamp and the flat cable was high in the conventional art.

SUMMARY OF THE INVENTION

Therefore, it is one of the objectives of the invention to provide a clamp structure than allows the clip to be fixed to a flat cable in a reliable manner with a simple assembly process. The clamp structure improves workability, while reducing the manufacturing cost of the clip and the flat cable.

To achieve the objectives, a clamp that can hold a flat cable in a reliable manner under a small force is provided. The clamp comprises a base, a cover, a projection extending from the base toward the cover, and a pusher consisting of a pair of cantilevers positioned alternately. The base consists of a bottom and two sidewalls extending from the bottom and facing each other, and receives the flat cable. The cover is connected to one of the sidewalls of the base. When receiving the flat cable, the projection passes through the flat cable via a silt formed through or notched in the flat cable. The cantilevers hold down the flat cable when the cover is closed.

With this arrangement, the projection firmly rivets the flat cable, and at the same time, the cantilevers hold down the flat cable, thereby ensuring that the flat cable is held between the cover and the base in a reliable manner.

Preferably, the cantilevers are positioned at points symmetrical to the center of the cover so that the pushing force is applied to the flat cable uniformly. The cantilevers are made of an elastic and flexible material whose restoration force holds down the flat cable when the cover is closed.

Each cantilever has a guide face that slides along the surface of the flat cable, or along the side edge of the flat cable if the flat cable is multi-layered, as the cover is closed, allowing the cover to be closed smoothly.

The clamp also has a clip extending from the reverse side of the bottom of the base, in a direction opposite to the projection. The clip allows the flat cable to be attached to, for example, an automobile body.

Preferably, a lock protrusion is formed on the outer face of the other sidewall, and a lock arm is formed in the end of the cover, so that when the cover is closed, the lock protrusion engages with the lock arm. The lock protrusion and the lock arm can securely hold the cover around the flat cable.

In another aspect of the invention, a clamping structure comprising a flat cable and a clamp attached to the flat cable is provided. This clamp structure simplifies assembling steps for fixing the flat cable to, for example, an automobile body. The flat cable consisting of a multiple conductors arranged in parallel to each other at a predetermined interval and an insulator covering and coupling the conductors. The flat cable has a slit in the insulator between adjacent conductors. The clamp has a U-shaped base for receiving the flat cable, a cover connected to the base, a projection extending from the base, and a pusher formed in the cover and holding down the flat cable when the cover is closed. The projection is fit into the slit of the flat cable. The slit is formed through the insulator, or alternatively, it is notched in the insulator with a thin portion left. In the latter, the projection of the clamp penetrates the thin portion when it is fit into the slit. The pusher consists of a pair of cantilevers positioned alternately so as to securely hold down the flat cable without requiring much force when the cover is closed.

BRIEF DESCRIPTION OF THE DRAWINGS

Other objects and advantages will be apparent from the following detailed description of the invention in conjunction with the attached drawings, in which.

DETAILED DESCRIPTION OF THE PREFERRED EMBODIMENTS

Figure 1A:
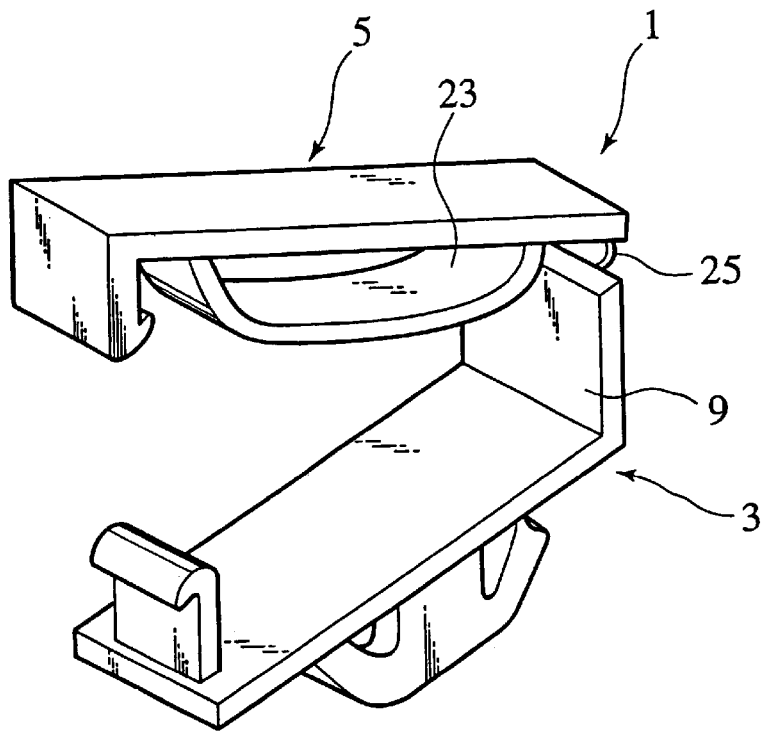
FIG. 1A is a perspective view of a conventional clamp.
Figure 1B:
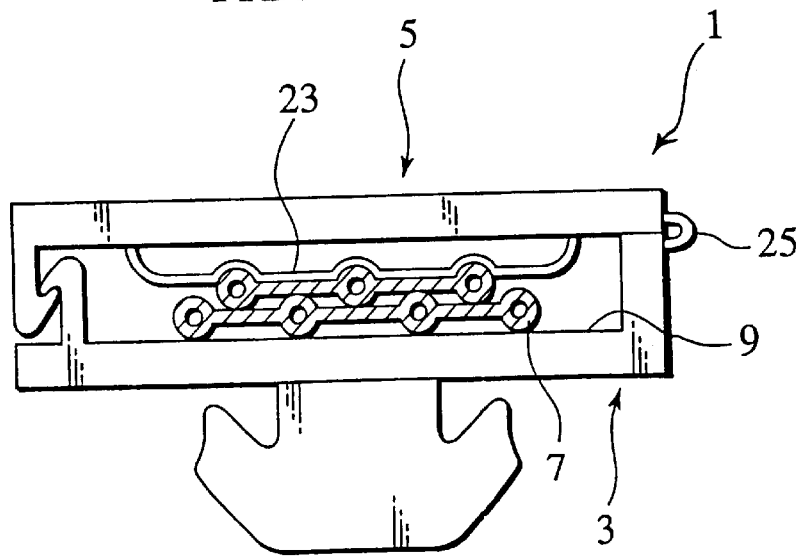
FIG. 1B is a cross-sectional view of the clamp in FIG. 1A holding a flat cable during actual use.
Figure 2:
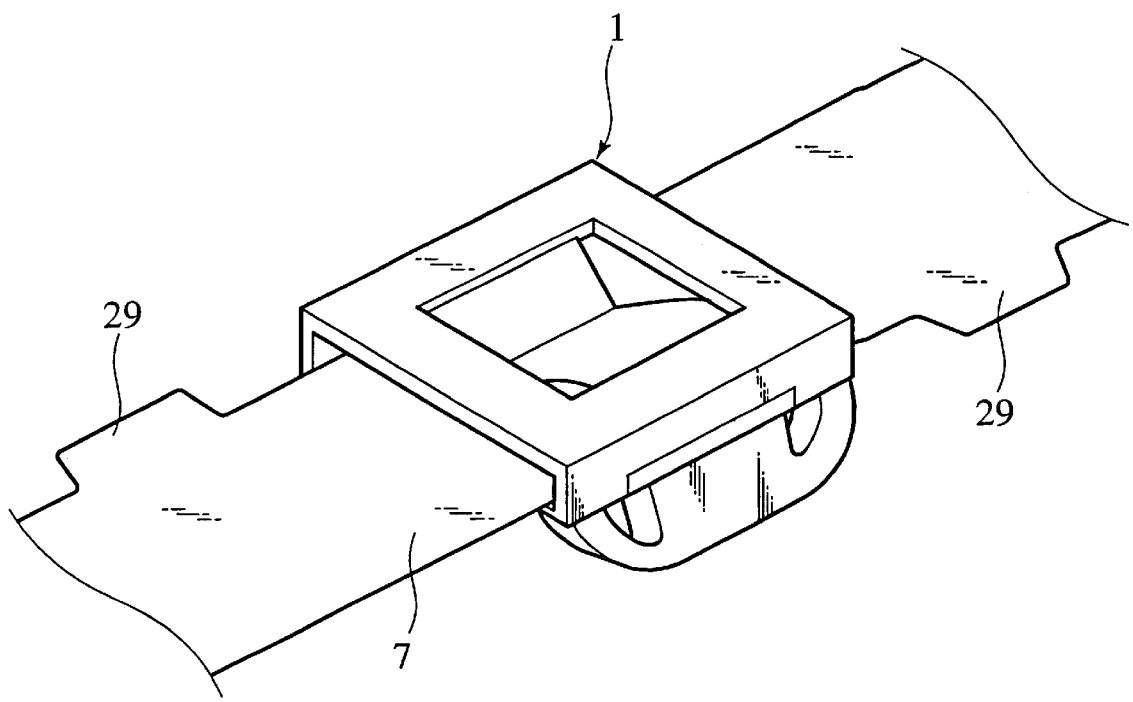
FIG. 2 is a perspective view of the conventional clamp attached to the flat cable having stoppers along its side edges.
Figure 3:
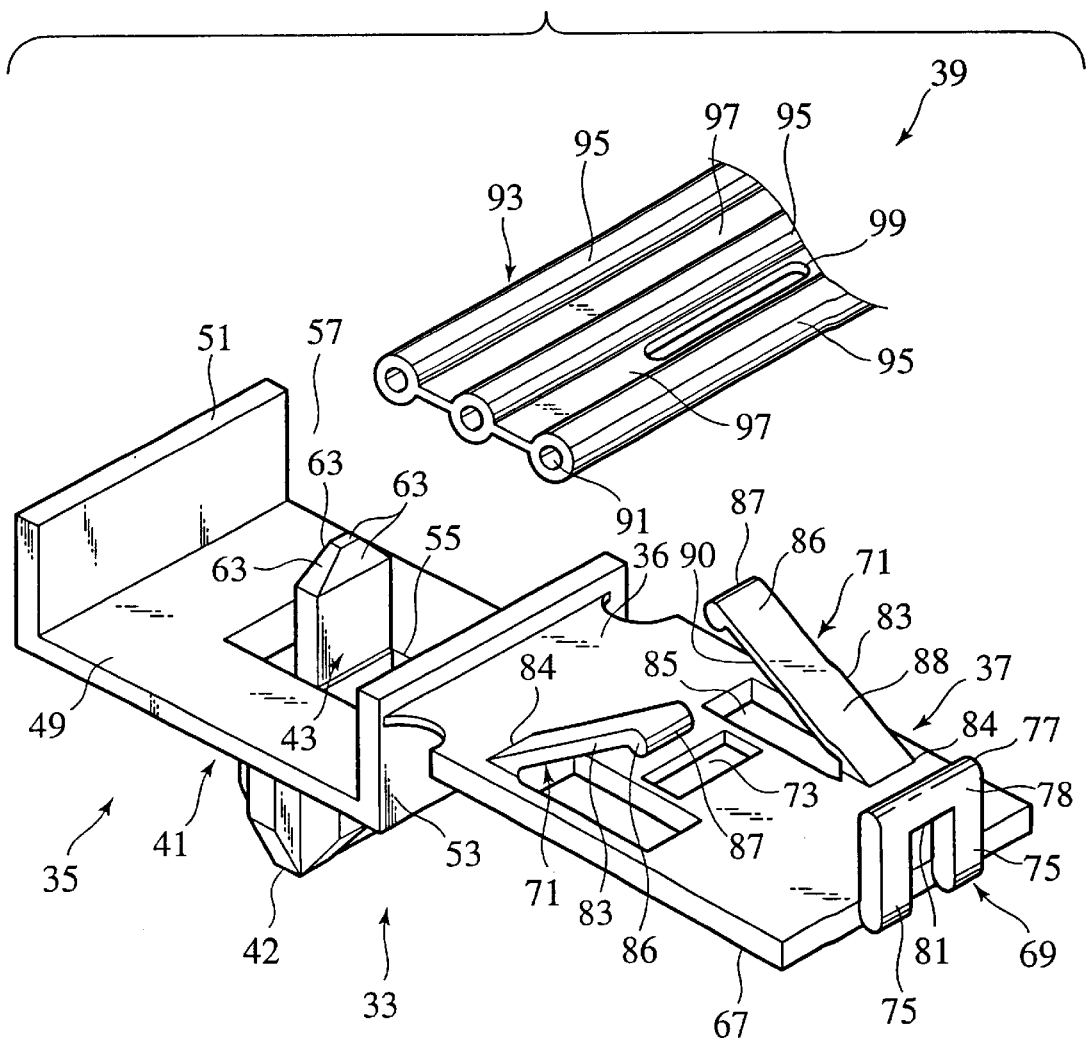
FIG. 3 is a perspective view showing a clamp used in a first embodiment of a clamp support structure to a flat cable, according to the present invention.
Figure 4:
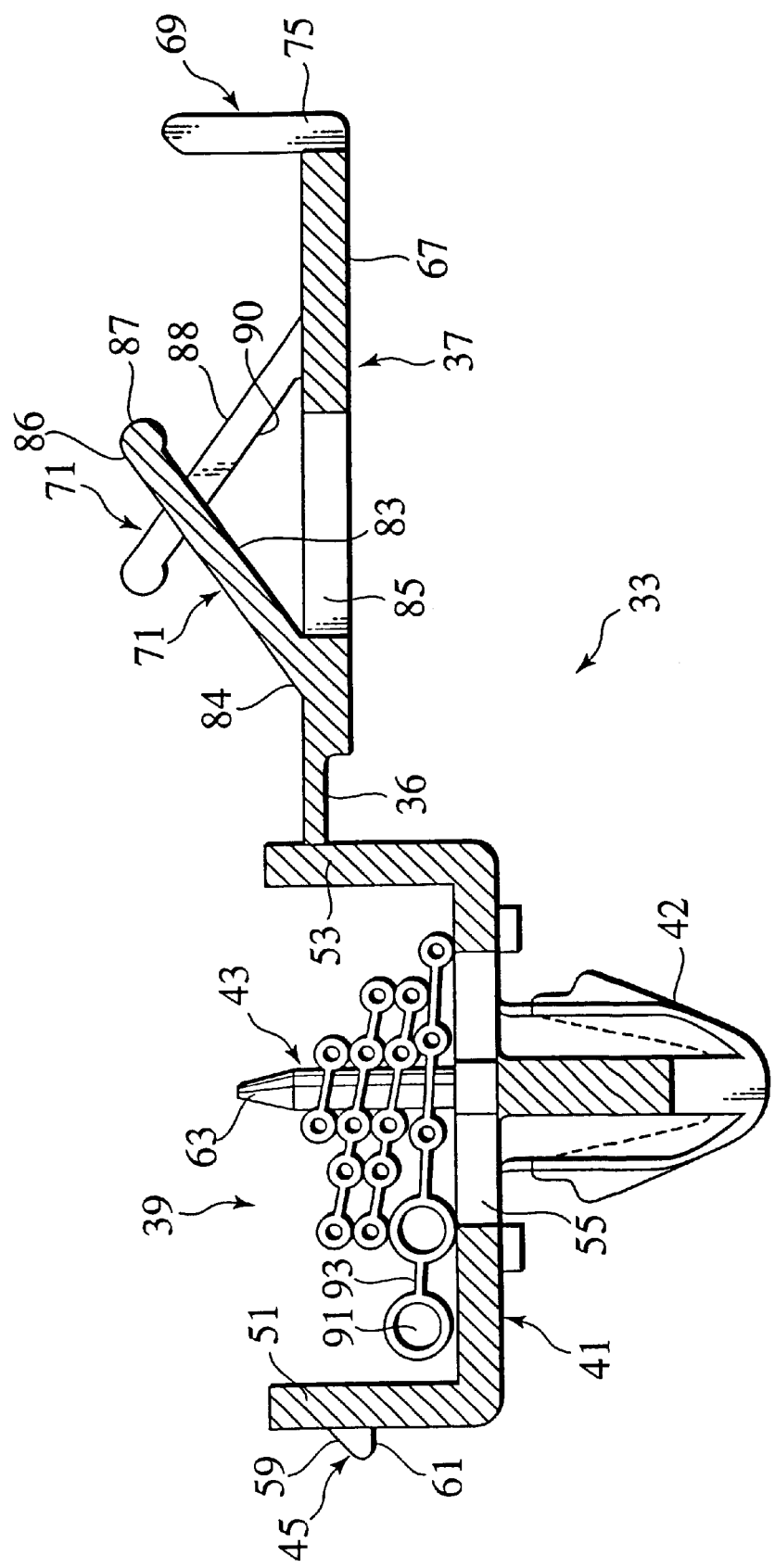
FIG. 4 is a cross sectional view showing a flat cable engaged with the clamp shown in FIG. 3.
Figure 5:
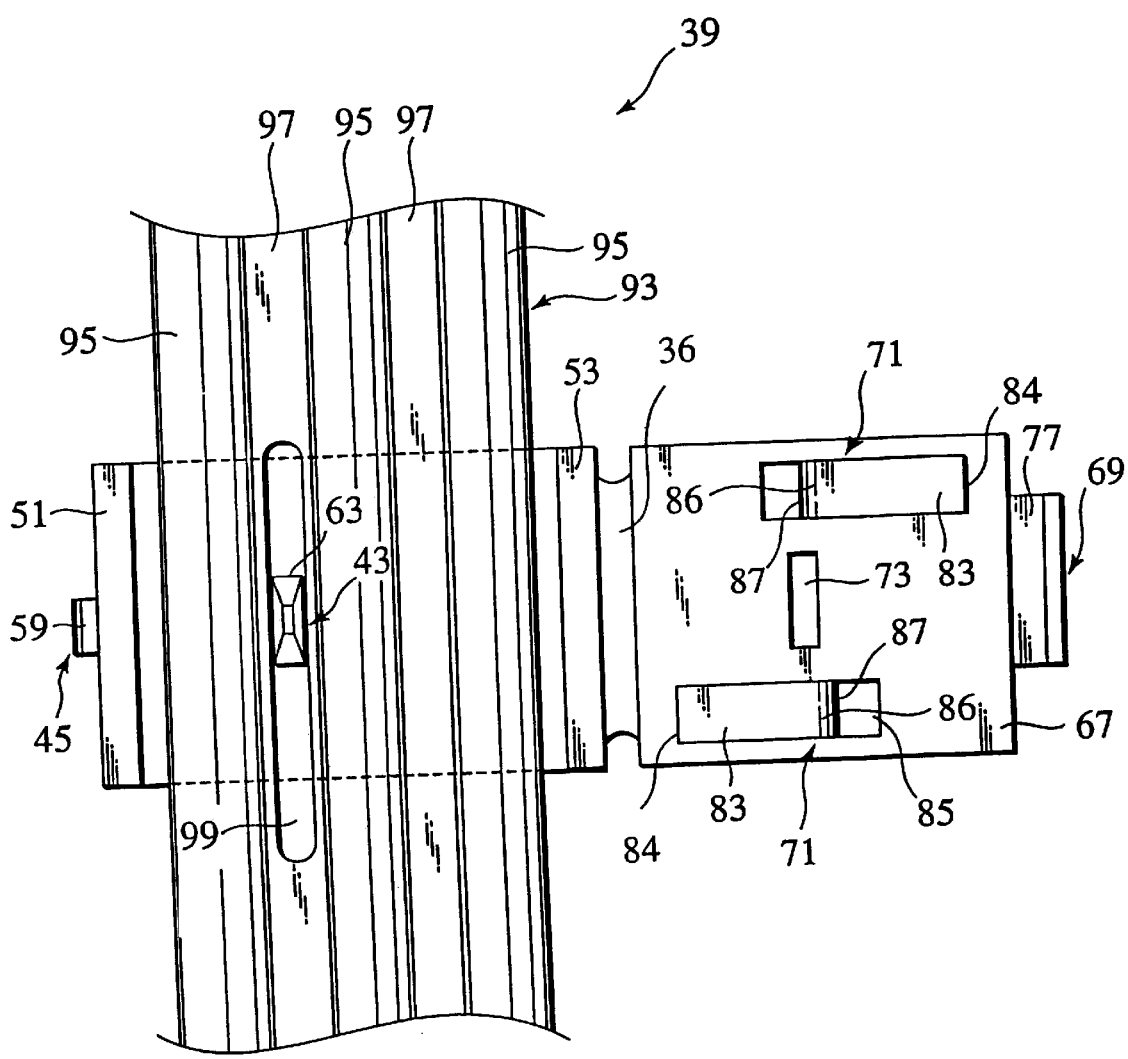
FIG. 5 is a plan view of the clamp shown in FIG. 4.

FIG. 3 is a perspective view of a clamp structure for attaching a clip to a flat cable according to an embodiment of the present invention. FIG. 4 is a cross sectional view showing the flat cable accommodated in the base of the clamp shown in FIG. 3, with the cover open. FIG. 5 is a plan view of the flat cable and the clamp shown in FIG. 4.

As illustrated in FIGS. 3 through 5, a clamp 33 comprises a base 35, a cover 37 connected to the base 35 via a hinge 36, and a clip 42 extending from the bottom face of the base 35. Multiple clamps 33 are arranged along the longitudinal axis of a flat cable 39 at a predetermined pitch, and the flat cable 39 is fixed to a desired position in the automobile using the clip 42.

The base 35 has a flat-cable receiving section 41 for receiving the flat cable 39. The flat-cable receiving section 41 consists of a rectangular bottom 49 and two opposed sidewalls 51, 53 extending vertically from both ends of the bottom 49. The bottom 49 has an opening 55 in the middle, and a projection 43 that extends upward from the opening 55.

The projection 43 is a bridge across the width of the opening 55. The height of the projection 43 is greater than that of the sidewalls 51 and 53. To be more precise, projection 43 has a tapered tip 63, which extends above the top of the sidewalls 51 and 53. The projection 43 is to be fit into a slit 99 formed in the flat cable 39, as will be explained below, and the tapered tip 63 functions as a guide for allowing the projection 43 to be inserted in the slit 99 smoothly.

As illustrated in FIG. 4, a lock 45 projects from the outer face of the sidewall 51 of the base 35. The lock 45 has a tilted face 59 and a bottom face 61. The lock 45 will be engaged with a lock arm 69 provided to the cover 37, the details of which will be described below.

Clip 42 extends in a direction opposite to that of the projection 43. Preferably, the clip 43 is connected to the bottom end of the projection 43 so as to extend downward. The clip 42 is to be fit into a hole (not shown) formed in an automobile to fix the flat cable 39 to the automobile body.

Cover 37 pivots about the hinge 36. In the preferred embodiment, the cover 37 and the hinge 36 are formed monolithically with the base 35. The hinge 36 is made thinner than the cover so that the cover can pivot. The cover 37 has a main face 67, and a lock arm 69 extending from the end of the main face 67. The cover 37 also has a pair of elastic levers 71 extending obliquely from the main face 67. The levers 71 make up a pusher for holding down the top face of the flat cable 39. In the preferred embodiment, the levers 71 are cantilevers positioned at points symmetrical to the center of the cover.

A slit 73 is formed in the cover 37 to receive the projection 43 of the base 35. Accordingly, the shape and the size of the slit 73 correspond to or are slightly larger than the horizontal cross-section of the projection 43. When the cover 37 is pivoted about the hinge 36 to close the upper opening 57 of the base 35, the projection 43 fits into the slit 73. The elastic levers 71 are positioned alternately on either side of the slit 73.

Each lever 71 has a fixed end 84 and a free end 86. The fixed end 84 is connected to the main face 67 of the cover 37, and a plate 83 extends between the fixed end 84 and the free end 86. The fixed ends 84 of the levers 71 are positioned at points symmetrical to the center of the main face 67 of the cover 37. The plate 83 of the elastic lever 71 extends obliquely from the fixed end 84, and the free end 86 is movable toward the main face 67 of the cover 37. When the cover 37 is closed, the elastic levers 71 project into the space defined by the flat-cable receiving section 41. The free end 86 of the lever 71 has a guide face 87.

The guide face 87 is curved and connects the upper surface 90 and the rear surface 88 of the plate 83. The guide face 87 of the lever 71 comes into contact with the top face of the flat cable 39, and slides along the top face toward the side edge of the flat cable. If the flat cable 39 consists of multiple layers of wire belt, as shown in FIG. 4, the guide face 87 slides along the side edges of the layered flat cable 39. A pair of holes 85 are formed in the main face 67 corresponding to the levers 71. Each hole extends from the root (i.e., the fixed end 84) of the elastic lever 71 in the same direction as the plate 83.

The lock arm 69 extending from the end of the cover 37 is made of a flexible material, and consists of arms 75 and a lock 77 bridged between the arms 75. The arms 75 define a gap between them, which corresponds to the width of the lock protrusion 45 formed on the sidewall 51 of the base 35. The lock 77 has a curved face 78 and a bottom face 81. The bottom face 81 comes into contact with the lock protrusion 45 of the base 35 when the cover 37 is closed.

By accommodating the flat cable 39 in the receiving section 41 of the base 35, and by closing the cover 37, the flat cable 39 is held firmly by the clamp 33.

As is shown in FIGS. 3 and 4, flat cable 39 comprises a plurality of conductors 91 arranged in parallel to one another and an insulator 93 covering the conductors 91. The insulator 93 includes conductor cover portions 95 and coupling portions 97 extending between adjacent conductors 91. Multiple slits 99 are formed in the coupling portion 97 at a predetermined pitch along the longitudinal axis (although only one is shown in FIGS. 3 and 5). The slit 99 is slightly longer than the width of the projection 43 of the base 35 so as to receive the projection 43. Preferably, the insulator 93 is flexible and elastic so that the slit 99 formed through coupling portion 97 can easily receive the projection 43. In this case, the slit appears closed before insertion of the projection 43, and closes tightly around the projection 43 when inserted. Alternatively, the slit 99 may be notched in the coupling portion 97 with a very thin portion remaining so that the projection 43 can easily break and penetrate them.

When attaching the clamp 33 to the flat cable 39, the flat cable 39 is placed in the receiving section 41 of the base 35 so that the projection 43 is inserted into the slit 99 of the flat cable 39. During the insertion of the projection 43, the slit 99 deforms along the contour of the tapered tip 63 of the projection 43. Once the projection 43 fits into the slit 99, the edges of the slit 99 are in tight contact with the projection 43 due to its own elasticity. In this manner, the flat cable 39 is fixed to the base 35 of the clamp 33.

Then, the cover 37 is pivoted about the hinge 36 to close the cover 37. As the cover 37 is closed, the guide faces 87 of the levers 71 come into contact with the top surface of the flat cable 39. If the cover 37 is further closed, the levers 71 are flattened pivoting about the roots (or the fixed ends) 84. The levers 71 function as leaf springs, and have a tendency to return to the original due to the restoration force. As a result, the levers 71 hold down the flat cable 39 against the bottom 49 of the base 35.

When the cover 37 is completely closed, the lock arm 69 of the cover 37 is engaged with the lock protrusion 45 of the base 35. In this state, the base 35 and the cover 37 firmly hold the flat cable 39 between them with the levers 71 pressing down on the top face of the flat cable 39. The projection 43 that penetrates the slit 99 of the flat cable 39 is fit into the slit 73 of the cover 37, thereby preventing the projection 43 from coming out of the slit 99 of the flat cable 39.

After the clamp 33 is attached to the flat cable 39, even should undesirable force be applied to the clamp 33, there is a margin allowed for it shifting along the longitudinal axis of the flat cable 39 because the slit 99 is slightly longer than the width of the projection 43. However, the position of the clamp 33 can be easily adjusted as required by manipulating the top portion of the projection 43 projecting out from the slit 73 of the cover 37. Accordingly, the clip 42 can be maintained at a desired position. Although the explanation has been made regarding a single layer flat cable, a multi-layered flat cable can also be held firmly by the clamp 33 in a reliable manner. In such a case, the slit 99 is formed in each layer of the flat cable so as to allow the projection 43 of the base 35 to penetrate the flat cable 39, as shown in FIG. 4. As has been described above, the clamp of the present invention can firmly hold the flat cable using a double retention structure, in which the projection 43 of the base 35 fixes the flat cable, while the levers 71 hold the flat cable against the bottom of the base 35. In this arrangement, the levers, which function as pushers, do not need to have a large elastic force. Even should the number of layers, the thickness of the flat cable 39, or the amount of deformation or displacement of the levers 71 increase, the cover 37 can be closed with minimal force. Consequently, labor required to assemble the clamp 33 into the flat cable is reduced and operability is improved.

On the other hand, even if the flat cable is thin or single-layered with a small displacement of the levers 71, the flat cable is still held reliably because the projection 43 secures the flat cable to the base 35. Accordingly, undesirable shift of the flat cable can be prevented.

The slit 99 formed in the coupling portion of the flat cable allows the position of the clamp 33 to be adjusted easily because the projection 43 of the clamp 33 is inserted in the flexible slit 99.

Thus, the clamp of the present invention does not require the flat cable 39 to have fringes or stoppers along its edges.

The clamp 33 has a clip 42 extending downward from the root of the projection 43. When actually attaching the flat cable 39 to the automobile, the clip 42 is fit into a counter-part connector. Since adjusting the projection 43 easily regulates the position of the clip 42, assembling the flat cable to the automobile becomes easy.

The clamp of the present invention has a pair of flexible levers 71 positioned and extending in the alternate manner, in order that the flat cable is pushed against the base under a uniform force. The guide face 87 of each lever 71 slides along the top surface of the flat cable or the side edges of the flat cable if it has multiple layers, enabling the cover 37 to be folded in and closed smoothly without requiring much force.

Although, in the preferred embodiment, the clamp 33 has a slit 73 in the cover 37 to receive the projection 43, the slit 73 may be omitted. In such a case, the projection 43 would be accommodated in the space between the cover 37 and the base 35, and the position of the clip 42 would be adjusted by directly moving the clip 42.

The clamp of the present invention can be used with various types of flat cables of different thickness and sizes, and can securely hold the slat cable because of the combination of the alternate levers 71 and the projection 43.

Although the invention has been described based on the preferred embodiment, the invention is not limited to this example and many changes and substitutions are possible without departing from the scope of the invention.

What is claimed is:

1. A clamp for holding a flat cable comprising:
   a base for receiving the flat cable, the base comprising a bottom with two opposed sidewalls extending from it;
   a cover connected to one of the sidewalls of the base;
   a projection extending from the bottom of the base in the same direction as the sidewalls, the projection being fit into a slit formed through or notched in the flat cable; and
   a pusher comprising a pair of cantilevers positioned alternately and extending from the cover toward the base, each of the cantilever arms of the pushers holding down a portion of the flat cable by contacting the cable when the cover is closed.

2. The clamp according to claim 1, wherein the cantilevers are positioned at points symmetrical with respect to the center of the cover.

3. The claim according to claim 1, wherein each cantilever has a guide face that slides along the surface of the flat cable as the cover is closed.

4. The clamp according to claim 1, further comprising a clip extending from the bottom of the base in a direction opposite to that of the projection.

5. The clamp according to claim 1, further comprising a lock protrusion formed on the outer face of the other sidewall, and a lock arm formed in the end of the cover, the lock protrusion engaging with the lock arm upon closing the cover.

6. The clamp according to claim 1, wherein the projection has a tapered top portion.

7. The clamp according to claim 1, wherein the cover is connected to one of said sidewalls via a hinge; the hinge and the cover being monolithically formed with the base.

8. A clamp for holding a flat cable comprising:
   a base for receiving the flat cable, the base comprising a bottom with two opposed sidewalls extending from it;
   a cover connected to one of the sidewalls of the base;
   a projection extending from the bottom of the base in the same direction as the sidewalls, the projection being fit into a slit formed through or notched in the flat cable; and
   a pusher comprising a pair of cantilevers positioned alternately and extending from the cover toward the base, each of the cantilever arms of the pushers holding down the flat cable by contacting the cable when the cover is closed, wherein
   the cover has a slit between the pair of cantilevers, the slit receiving the projection when the cover is closed.

9. A clamping structure comprising:

a flat cable comprising multiple conductors arranged in parallel to each other at a predetermined interval and an insulator covering and coupling the conductors, the flat cable having a slit formed through or notched in the insulator; and a clamp attached to the flat cable to allow the flat cable to be secured to a prescribed position, the clamp comprising:

a U-shaped base for receiving the flat cable, a cover connected to the base, a projection extending from the base, and fit into a slit of the flat cable, and a pusher comprising a pair of cantilevers positioned alternately and extending from the cover toward the base, each of the cantilever arms of the pushers holding down a portion of the flat cable by contacting the cable when the cover is closed.

* * * * *

UNITED STATES PATENT AND TRADEMARK OFFICE
CERTIFICATE OF CORRECTION

PATENT NO. : 6,561,465 B2
DATED : May 13, 2003
INVENTOR(S) : Masayuki Kondo

It is certified that error appears in the above-identified patent and that said Letters Patent is hereby corrected as shown below:

Column 2,
Line 6, change "than" to -- that --.
Line 30, change "silt" to -- slit --.

Column 5,
Line 32, after "as shown in FIG. 4." start a new paragraph.

Column 6,
Line 12, change "slat" to -- flat --.

Signed and Sealed this

Thirtieth Day of December, 2003

JAMES E. ROGAN
*Director of the United States Patent and Trademark Office*